United States Patent [19]

Suzuki et al.

[11] Patent Number: 5,537,633
[45] Date of Patent: Jul. 16, 1996

[54] TABLE DATA ENTERING DEVICE

[75] Inventors: Akira Suzuki; Kilho Shin, both of Kanagawa, Japan

[73] Assignee: Fuji Xerox Co., Ltd., Tokyo, Japan

[21] Appl. No.: 545,545

[22] Filed: Oct. 19, 1995

Related U.S. Application Data

[63] Continuation of Ser. No. 199,085, Feb. 22, 1994, abandoned.

[30] Foreign Application Priority Data

Feb. 23, 1993 [JP] Japan ............................. 5-057887

[51] Int. Cl.⁶ .................................................. G06F 17/30
[52] U.S. Cl. ........................ 395/600; 395/145; 395/149; 364/419.1; 364/419.14; 364/974; 364/225.6; 364/225.8; 364/282.1; 364/DIG. 1
[58] Field of Search ............................... 395/600, 145, 395/149; 364/419.1, 419.4

[56] References Cited

U.S. PATENT DOCUMENTS

| | | | |
|---|---|---|---|
| 4,661,904 | 4/1987 | Kurakake et al. | 395/375 |
| 5,091,868 | 2/1992 | Pickens et al. | 395/148 |
| 5,119,476 | 6/1992 | Texier | 395/157 |
| 5,179,649 | 1/1993 | Masuzaki et al. | 395/148 |
| 5,241,464 | 8/1993 | Greulich et al. | 364/401 |
| 5,307,262 | 4/1994 | Ertel | 364/413.01 |
| 5,343,387 | 8/1994 | Honma et al. | 364/401 |
| 5,367,619 | 11/1994 | Dipaolo et al. | 364/149 |
| 5,410,646 | 4/1995 | Tondevold et al. | 395/149 |

FOREIGN PATENT DOCUMENTS 3-206552  9/1991  Japan .

OTHER PUBLICATIONS

Baras et al., "Symphony vs. Framework", *PC Magazine*, v3, Dec. 11, 1984, pp. 296–305.
Christopher Van Buren, "Using Spreadsheets to Print Forms", *A+*, V5, No. 3, Mar. 1987, pp. 80–82.
Harvey P. Macon, "RS/1 Research System", *BYTE*, V13, No. 2, Feb. 1988, p. 172.
Tony Pompili, "Borland Readies Forms–Based Tool", *PC WEEK*, V8, No. 4, Jan. 28, 1991, pp. 1–2.
Heather Clancy, "Borland Intnl. is Introducing an Object–Oriented Development Tool ObjectVision", *Computer Reseller News*, Feb. 11, 1991, p. 2.
Rich Malloy, "Borland Hopes to Make Forms Interesting", *BYTE*, v16, No. 5, May, 1991, p.56.
Vincent Alferi, *The Best Book of WordPerfect 5.1*, Haden Books, (Carmel, Indiana, 1988).
Alan Simpson, *Mastering WORDPERFECT 5.1 & 5.2 For WINDOWS*, SYBEX, (Alemeda, Califormia, 1993), pp. 175–236.

*Primary Examiner*—Thomas G. Black
*Assistant Examiner*—Paul R. Lintz
*Attorney, Agent, or Firm*—Finnegan, Henderson, Farabow, Garrett & Dunner

[57] ABSTRACT

In a table data entering device, an input table generating unit generates an input table frame in the form of a table. An input table retaining unit retains the input table frame. A table data entering unit is used for entering table data containing titles and element data with the aid of the input table frame retained in the input table retaining unit. An input data retaining unit retains the entered table data. A set generating unit generates sets of title string and element data associated therewith from the table data retained in the input data retaining unit on the basis of the input table frame retained in the input table retaining unit.

8 Claims, 13 Drawing Sheets

FIG. 1

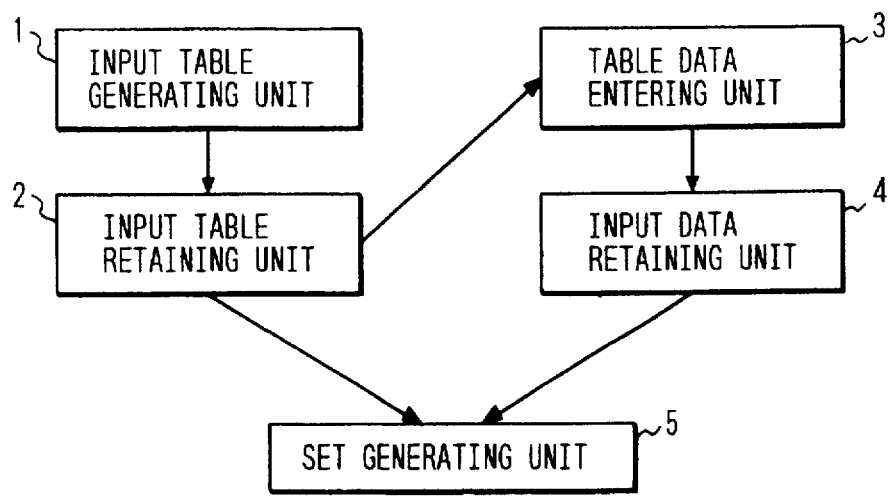

FIG. 2

```
\begin(tabular) (|l|l|r|r|)  \hline
\multicolumn(2) (|c|) (--)
                            &\multicolumn(1) (c|) (1982)
                            &\multicolumn(1) (c|) (1983) \\ \hline
CONSUMPTION BY HOME         & PETROLEUM     & 143960 & 150520 \\ \cline(2-4)
                            & GAS           & 4620   & 17000  \\ \cline(2-4)
                            & ELECTRIC POWER& 35900  & 37630  \\ \cline(2-4)
                            & COAL          & 3710   & 3060   \\ \hline
CONSUMPTION BY INDUSTRY     & PETROLEUM     & 44760  & 42110  \\ \cline(2-4)
                            & GAS           & 2876   & 3454   \\ \cline(2-4)
                            & ELECTRIC POWER& 56745  & 34561  \\ \cline(2-4)
                            & COAL          & 34513  & 23445  \\ \hline
CONSUMPTION BY AGRICULTURE  & PETROLEUM     & 3452   & 4456   \\ \cline(2-4)
                            & GAS           & 3453   & 434566 \\ \cline(2-4)
                            & ELECTRIC POWER& 23430  & 45660  \\ \cline(2-4)
                            & COAL          & 5460   & 5580   \\ \hline
\end(tabular)
```

FIG. 3

|   | A | | B | |
|---|---|---|---|---|
|   | $a_1$ | $a_2$ | $a_1$ | $a_2$ |
| a |   |   |   |   |
| b |   |   |   |   |

FIG. 4

|   | A | | | B | | |
|---|---|---|---|---|---|---|
|   | $a_1$ | $a_2$ | $a_3$ | $a_1$ | $a_2$ | $a_3$ |
| a |   |   |   |   |   |   |
| b |   |   |   |   |   |   |

FIG. 5

|   |   | a | | | b | | | c | | |
|---|---|---|---|---|---|---|---|---|---|---|
|   |   | d | e | f | g | h | i | j | k | l |
| A | C |   |   |   |   |   |   |   |   |   |
|   | D |   |   |   |   |   |   |   |   |   |
|   | E |   |   |   |   |   |   |   |   |   |
| B | F |   |   |   |   |   | 12 |   |   |   |
|   | G |   |   |   |   |   |   |   |   |   |

FIG. 6
FIG. 7
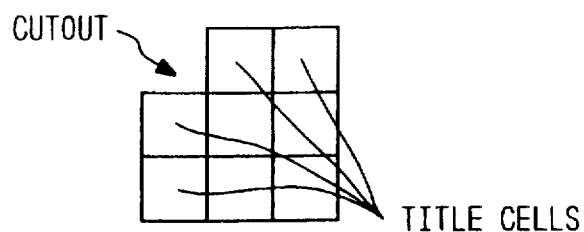
CUTOUT
TITLE CELLS
FIG. 8
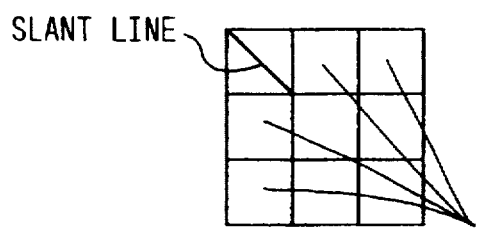
SLANT LINE
TITLE CELLS
FIG. 9
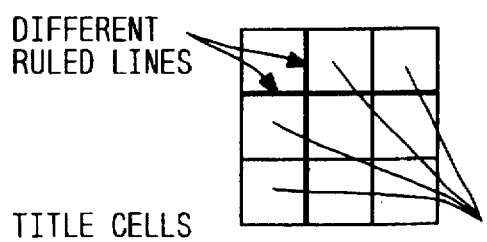
DIFFERENT RULED LINES
TITLE CELLS
FIG. 10
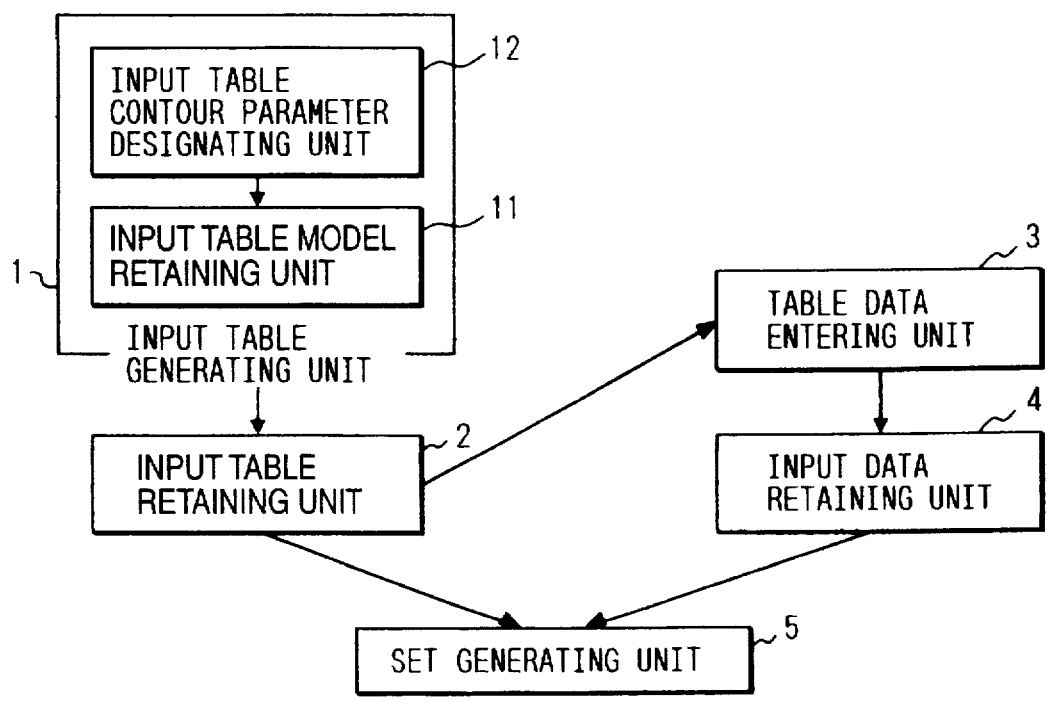

FIG. 12
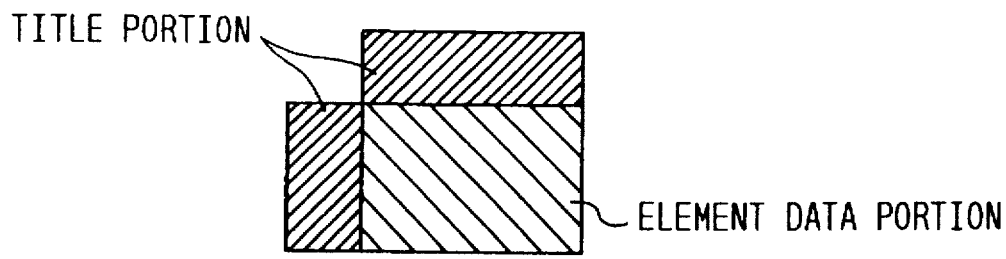
FIG. 13
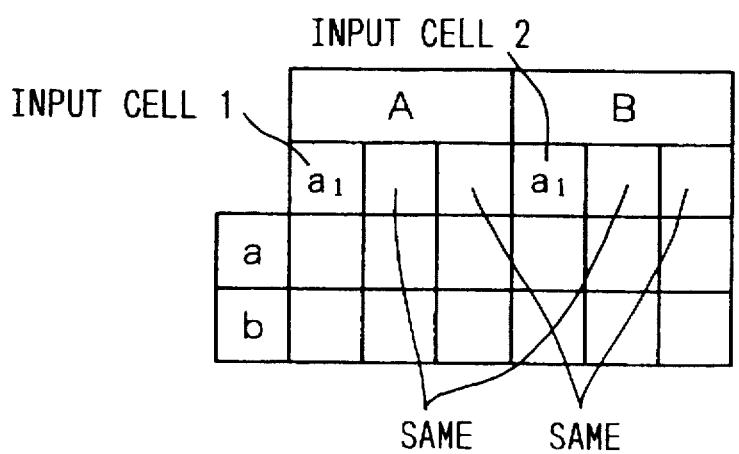
FIG. 14
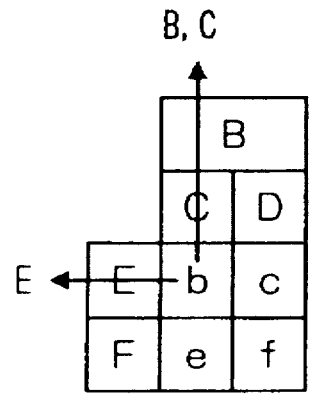
FIG. 15
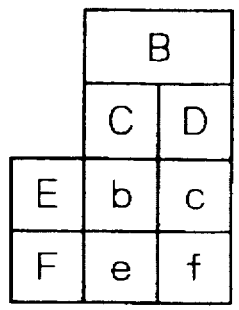
FIG. 16
| TITLE STRING | DATA |
|---|---|
| (B, C, E) | b |
| (B, D, E) | c |
| (B, C, F) | e |
| (B, D, F) | f |

| TITLE STRING | DATA |
|---|---|
| (A, E) | a |
| (B, C, E) | b |
| (B, D, E) | c |
| (A, F) | d |
| (B, C, F) | e |
| (B, D, F) | f |

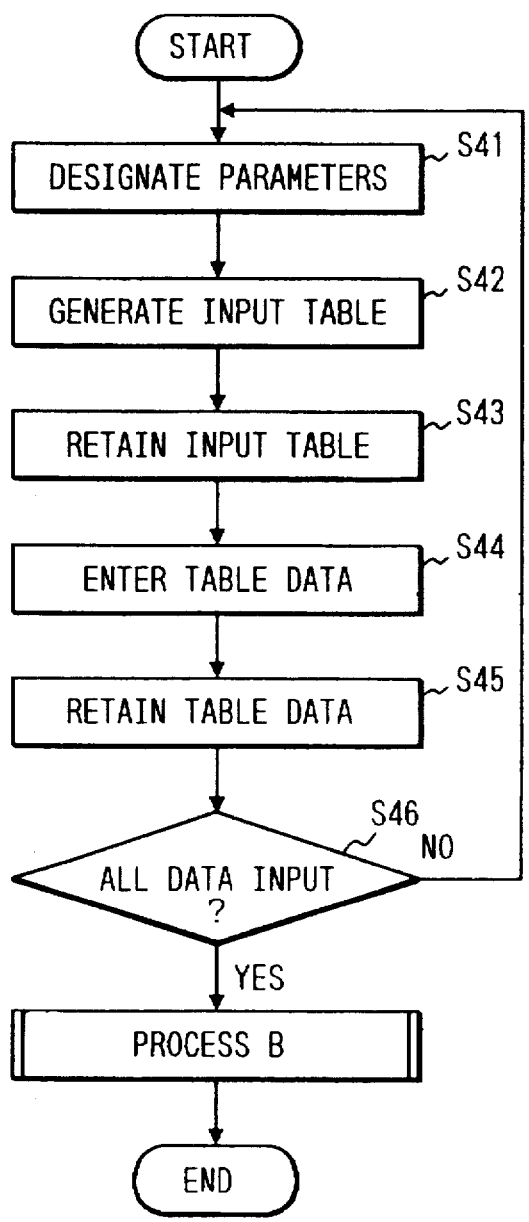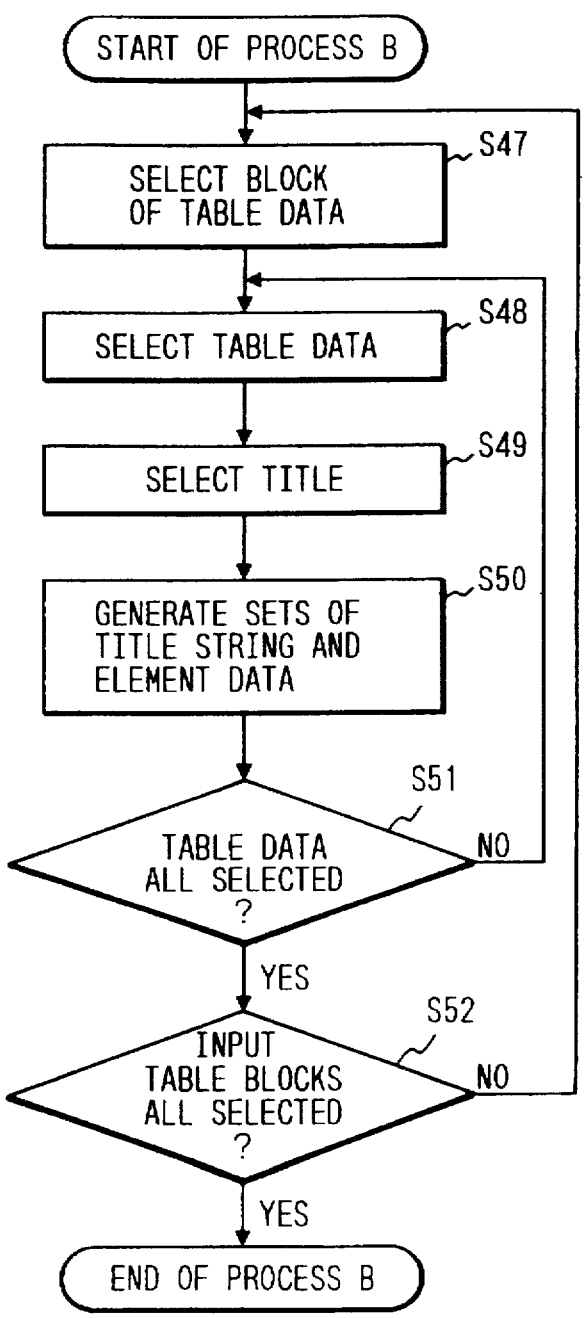

| | A | | | B | | |
|---|---|---|---|---|---|---|
| | | C | D | | C | D |
| E | a | | | | b | c |
| F | d | | | | e | f |

FIG. 29

|  |  | DOG | CAT |
|---|---|---|---|
| CHEERFUL | NUMBER OF TESTED ANIMALS | 3 | 8 |
| CHEERFUL | % | 30 | 44 |
| GLOOMY | NUMBER OF TESTED ANIMALS | 7 | 10 |
| GLOOMY | % | 70 | 56 |
| NUMBER OF TESTS | | 10 | 18 |

FIG. 30

| TITLE STRING | DATA |
|---|---|
| (DOG, CHEERFUL, NUMBER OF TESTED ANIMALS) | 3 |
| (CAT, CHEERFUL, NUMBER OF TESTED ANIMALS) | 8 |
| (DOG, CHEERFUL, %) | 30 |
| (CAT, CHEERFUL, %) | 44 |
| (DOG, GLOOMY, NUMBER OF TESTED ANIMALS) | 7 |
| (CAT, GLOOMY, NUMBER OF TESTED ANIMALS) | 10 |
| (DOG, GLOOMY, %) | 70 |
| (CAT, GLOOMY, %) | 56 |
| (DOG, NUMBER OF TESTS) | 10 |
| (CAT, NUMBER OF TESTS) | 18 |

TABLE DATA ENTERING DEVICE this application is a continuation of application Ser. No. 08/199,085, filed Feb. 22, 1994, now abandoned.

BACKGROUND OF THE INVENTION

1. Field of the Invention

The present invention relates to a table data entering device, and more particularly to a device for supporting the entering of table data in generating sets of titles and element data associated therewith.

2. Discussion of the Related Art

Table has been widely used to arrange complicated information into easy-to-understand information and to present such information to readers. In the present age of electronics documentation, the table is still a key part of documents.

The electronics documentation tools, such as DTPs (desk top publishings) and word processors, have tabulating functions without exception. The tabulating method for those tools comes in two varieties; a WYSIWYG (what you see is what you get) method and a command burying method.

The WYSIWYG method has been used in many DPTs and word processors. In the WYSIWYG method, the frame of a table is displayed on the screen. In forming the table, necessary information is put in the cells of the table. Here, the "frame of a table" consists of columns and rows. The "cell" is a rectangular area defined by the adjacent column lines and row lines. A specific example of this method is disclosed in Japanese Patent Unexamined Publication No. Hei. 3-206552. The tabulating procedure by this method will be described.

Firstly, the outline of a table to be formed is determined. The "outline of a table" means a frame defined by ruled lines in which the absolute positions of the ruled lines and the absolute spaces each between the ruled lines are not yet determined. In determining the outline of the table, an operator examines the relationships among all the titles and data items associated therewith that are to be input to the cells of the table, and designs the title cells and data cells (both referred to as cells) of the table, which have such sizes as to properly receive titles and data items.

Then, the operator forms the frame of the table or the table frame on the basis of the outline of the table through the system. In this case, the operator may take any of the two methods to form the table frame. In the first method, operations such as division, transfer of entries, deletion, and the like are repeatedly applied for the rows and columns of the table frame. In the second method, addition and deletion of ruled lines, change of the length of ruled lines, and the like are repeatedly applied for the table frame.

Finally, the operator inputs row and column titles and data items into the cells of the thus formed table frame.

The command burying method is used in the tabular ambient of LaTeX, and roff. In this method, a table is expressed in the form of the text in which character strings representative of cell contents, control symbols representative of borders between the cells, and commands to depict the ruled lines coexist. FIG. 2 is a diagram showing an example of display of a table described in terms of the LaTeX. A control symbol "&" represents the borders each between the cells in the row. The LaTeX program interprets the control symbol "&" as a command to depict the ruled lines, and draws a vertical line between the cell contents having the symbol "&" located therebetween. A control symbol "\\" represents the end of the row. A command "\hline" and "\cline" directs the system to depict horizontal lines. A position of the ruled line may be directed by the operator. If not directed by the operator, the system automatically calculates the position of the ruled line.

When using the command burying method to form a table, the operator first determines the outline of the table. Then, he progressively enters character strings of the cell contents, control symbols, commands in accordance with predetermined rules, using the determined table outline. After the entering of the data is completed, the formatter is booted to form a layout of the table. In this way, the table is formed.

In either tabulating method, the operator applies the procedure to determine the outline of a table and to actually form the table. However, those tabulating methods have the following problems.

The first problem is that it is impossible to edit logically. In the tabulating work, editing operation applicable for the table is deletion and addition based on the rows and columns. Such an editing operation concerns only the layout of the table. The logical editing operation is impossible. An example of the addition of column titles to a table already formed is illustrated in FIGS. 3 and 4. As shown in FIG. 3, child titles "$a_1$" and "$a_2$" are located under each of parent column titles "A" and "B". To add child titles "$a_3$" to the table of FIG. 3, the conventional editing method adds two columns respectively under the column titles "A" and "B" thereby to form a table as shown in FIG. 4. In this case, the operator per se must make an estimation of the formation of additional two columns in order to add the two child titles "$a_3$", and operate the system to add the two columns.

The second problem is that it is difficult to alter the table layout. To alter the contour of the table and the layout defining the relative positions of the cell contents, the operator must form another table anew. This job is time consuming.

FIG. 5 is an explanatory diagram showing a general table. The table consists of title cells and data cells. Data to be input to the data cell is called "element data". In most of the tables contained in the documents, the combinations of titles and element data are described in a corresponding manner. The combination of the titles is called a string of titles. The element data in a data cell where a specific column intersects a specific row, corresponds to the title strings including the row and column title strings in the row and column. Sometimes, a plurality of titles are contained in a single row and a single column. For example, in the table shown in FIG. 5, a title string as the combination of row titles B and F and column titles b and i is (B, F, b, i). This title string corresponds to element data "12".

In connection with the problems of the editing procedure for tabulation, if a set of a title string and corresponding element data is known, the logical editing may be applied to the table data. Various layouts can automatically be formed from the sets of title string and corresponding element data. Accordingly, alteration of the table layout is easy. The following two methods may be used for entering the title/element data sets.

In the first entering method, an operator enters sets of title string and element data associated therewith, or title/element data sets on a keyboard as follows:

title 1, title 2, . . . , title n, element data. One title frequently corresponds to a plurality of items of data. Accordingly, in this method, the same title must be entered many times. The data entering efficiency is poor. FIG. 6 is a diagram showing a table for explaining a conventional method of entering table data. Let us consider a case where titles and element data corresponding to or associated with these titles are entered to form the table of FIG. 6. In this case, the operator enters the table data in the following order:

A, C, 1
A, D, 4
B, C, 2
B, D, 3

In this example, the titles A, B, C, and D are each entered two times. Further, the operator must learn the title/element data sets which have been entered. Accordingly, such mistakes as the missing of data to be entered, the entering of the same data repeatedly, and the entering of data different from the data which should be entered, tend to occur in entering the table data.

Another method is a conventional tabulating method in which a table is formed using the WYSIWYG method or the command burying method, and desired title/element data sets are picked up from the formed table. In this method, the details of the layout of the table must be determined in forming a preparatory table before an intentional table is formed. The layout data is not contained in the title/element data sets picked up. Accordingly, it is useless.

SUMMARY OF THE INVENTION

The present invention has been made in view of the above circumstances and has an object to provide a table data entering device which enables an operator to efficiently enter the sets of title string and corresponding element data, without making such mistakes as missing of data to be entered and entering of useless data.

To achieve the above object, the invention provides a table data entering device including input table generating means for generating an input table frame in the form of a table, input table retaining means for retaining the input table frame, table data entering means for entering table data containing titles and element data with the aid of the input table frame retained in the input table retaining means, input data retaining means for retaining the entered table data, and set generating means for generating sets of title string and element data associated therewith from the table data retained in the input data retaining means on the basis of the input table frame retained in the input table retaining means.

With such an arrangement, the input table generating means generates an input table frame in the form of a table, which is used when table data is entered. Titles and element data associated with the titles may be entered by the table data entering means, with the assistance of the input table frame. Accordingly, an operator can enter table data without forming the detailed layout of a table to be formed. He can grasp the relationship among the titles when the input table frame is generated. Accordingly, he will not make such a mistake as to repeat the inputting of the same title. The table data entering work can be carried out efficiently. Since the table data is progressively entered in a tabulating manner, the operator will rarely miss out necessary titles. The set generating means automatically generates the sets of title string and element data associated therewith from the table data entered. Accordingly, table data with such a structure as to allow the table data to be edited logically can be obtained irrespective of the form of the input table, by merely entering the table data in a table form.

The sets of title string and element data generated by the set generating means forms a final table in table generating means not shown.

The table generating means includes table format retaining means, and refers to necessary parameters retained by the table format retaining means to generate a table. The table generating means selects and refers to one of a plurality of table formats retained by the table format retaining means. The form of the table to be generated can be altered by switching the table format for reference in the table format retaining mans. The selection of the table format in the table format retaining means may be carried out by selecting the format by the operator, or by automatically reading the format from the file or the like. If there is no instructions of selection, a predetermined format may be selected.

The table generating means includes parameter designating means. If there is a parameter to which any value is not designated after referring to the table format retaining means, the parameter designating means designates a value to the parameter to which any value is not designated. One parameter may be referred to a plurality of times. Further, when any value is not set to a parameter and the parameter is referred to a plurality of times, different values may be designated to the parameter for respective references by the parameter designating means. Of course, the value once entered may be used continuously. For the parameter to which any value is not designated, it is preferable that a predetermined value or a value calculated from other parameters is automatically used as a designated value. The table format can be altered variously within the outline determined by the parameters already set, by resetting the value of the parameter not determined in the table format.

When the values of the parameters are all designated, a single table format is determined. In accordance with the determined table format, the table generating means allocates in the table the information on the table entered by the table data entering means, to complete the table. The completed table consists of ruled lines and cell contents. In both title cells and data cells, it is permitted to stride over a plurality of columns or rows. The completed table is printed on a sheet of paper or displayed on a screen by display means, and stored in a storing medium as a file.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings, FIG. 1 is a block diagram showing an embodiment of a table data entering device according to the present invention;

FIG. 2 is a diagram showing an example of display of a table described by LaTeX;

FIG. 3 is an explanatory diagram showing a table;

FIG. 4 is an explanatory diagram showing the table of FIG. 3 modified so as to contain additional column subtitles;

FIG. 5 is an explanatory diagram showing a general table;

FIG. 6 is diagram showing a table for explaining a conventional method of entering table data;

FIG. 7 is a diagram showing a table for explaining how to discriminate title cells;

FIG. 8 is a diagram showing another table for explaining how to discriminate title cells;

FIG. 9 is a diagram showing still another table for explaining how to discriminate title cells;

FIG. 10 is a block diagram showing a second embodiment of the table data entering device according to the present invention;

FIG. 12 is a schematic diagram showing the input table;

FIG. 13 is an explanatory diagram for explaining how to enter titles;

FIG. 14 is a table for explaining the relationship of titles and element data associated therewith;

FIG. 15 is an explanatory diagram showing a first example of an input table entered by the table data entering unit;

FIG. 16 is a diagram showing an example of sets of titles and their associated element data, prepared by the set generating unit, the example corresponding to the example of FIG. 15;

FIG. 19 is an explanatory diagram showing a second example of the input table;

FIG. 20 is a diagram showing another example of the input table;

FIG. 21 a table showing sets of title string and the associated element data generated by the set generating unit on the basis of the input table of FIG. 20;

FIG. 22 is an explanatory diagram showing a third example of the input table as a first portion obtained when the input table of FIG. 20 is divided into two specific portions;

FIG. 23 is a explanatory diagram showing a fourth example of the input table as a second portion obtained when the input table of FIG. 20 is divided into two specific portions;

FIG. 24 is a flowchart showing the operation of the table data entering device when an input table is divided into a plurality of input tables for entering table data;

FIG. 25 is a flowchart showing the process B in the flowchart of FIG. 24;

FIG. 29 is an explanatory diagram showing a sixth example of the input table;

FIG. 30 is a table showing title/element data sets generated by the set generating unit when the input table shown in FIG. 29 is entered;

DETAILED DESCRIPTION OF THE PREFERRED EMBODIMENTS

Figure 11:
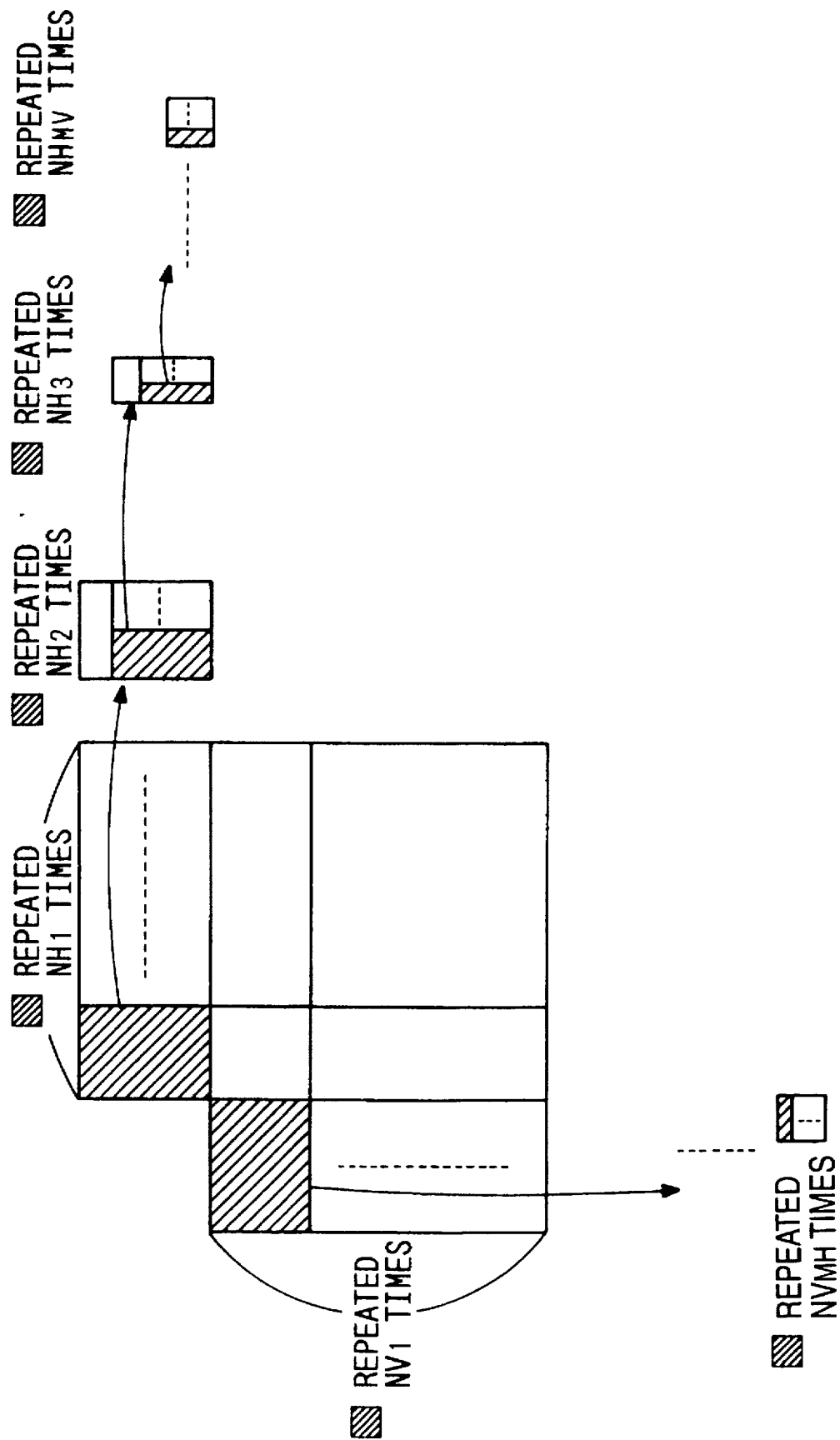
FIG. 11 is an explanatory diagram showing a model of the input table.

FIG. 1 is a block diagram showing a first embodiment of a table data entering device according to the present invention. In the figure, reference numeral 1 designates an input table generating unit; 2, an input table retaining unit; 3, a table data entering unit; 4, an input data retaining unit; and 5, a set generating unit.

The input table generating unit 1 is a unit for generating an input table frame in the form of a table (referred simply to as an input table). The "input table" is a table consisting of input cells for receiving table data, such as titles and element data. This input table is used only for ease of inputting table data. Accordingly, depiction of the detailed layout is not required for the input table. The input table is formed so as to show the logical relationships among the table data. There are many methods to generate the input table. One method is to designate a contour of an input table by a pointing device, such as a tablet, a mouse, and a write pen. Another method is to designate a contour of an input table by reading an input table drawn on paper with an image reader. In a further method, one or a plurality of models are prepared in the system, and parameters are specified to the models.

The input table retaining unit 2 retains an input table generated by the input table generating unit 1, and operates the input table for editing. The input table retaining unit 2 may retain a plurality of input tables. The editing operations for the input table are addition, deletion, division, and the like.

The table data entering unit 3 is a unit for entering table data, such as titles and element data, to the cells of the input table. In entering the table data, a desired input table to which table data is input may be designated, and a desired input cell of the designated input table may also be designated. In a table data entering method, identifiers are assigned to the cells respectively, and sets of the identifier and table data to be input are entered on a keyboard. In another entering method, the input table is displayed on a screen of a display device, and an operator inputs the table data to the cells displayed, with a write pen or a keyboard.

The input data retaining unit 4 is a unit for retaining table data entered by the table data entering unit 3 and the cells to which the table data is input. The table data retained by the input data retaining unit 4 may be considered as the data entered in the tabular form because the table data is correspondingly related to the input table retained by the input table retaining unit 2. Therefore, sets of titles and corresponding element data may be generated from the table data.

The set generating unit 5 generates sets of title string and corresponding element data on the basis of the relative positions of the cells of the input table and the table data input to the cells. To generate the data sets, the table data input to the element data cell is treated as element data. The table data input to the title cell located above or under the data cell, and on the right or left side of the data cell, is treated as the title. The element data and the title is combined into a title/element data set. A plurality of titles may be used for the element data. The information of the title/element data sets is used by, for example, another table generating device and used for generating a table as desired by an operator. The data input to this additional table generating device is structural data taking the form of the title/element data set. Accordingly, the input data reduces the amount of work to be done by the generating device. Further, it allows formation of various types of tables.

To distinguish the cells for the element data from the cells for the title, the operator may designate the cells as the data cells or title cells. Alternately, the system may automatically discriminate the types of the cells. A possible way to automatically discriminate the types of the cells is to discriminate the contour of an input table. FIGS. 7 to 9 show a set of diagrams for explaining the way of discriminating the title cells of a table. In an input table having a cutout in the upper left corner of the table as shown in FIG. 7, the cells located on the right side of the cutout and under the cutout are title cells. In an input table having a cell containing a slant line as shown in FIG. 8, the cells located on the right side of the slant-line contained cell and under the same are title cells. In an input table in which different kinds of ruled lines are drawn horizontally and vertically as shown in FIG. 9, the table is divided into four blocks by the horizontal and vertical lines. Of these four blocks, the cells contained in the upper right block and the lower left block are title cells. In this way, the titles and element data are discriminated on the basis of the input table, and sets of title string and element data are generated.

Another method exists. In this method, the title/element data sets are obtained as in the method previously stated. The input table retains some titles. A title string as the sum of the titles and the obtained title string, and element data associated with the title string are combined into a title/element data set. Further, in generating an input table by the input table generating unit 1, an area for title and an area for element data are determined. Information of the areas is attached to information of the input table. The title and element data are discriminated from each other, while referring to the area information.

The operation of the thus constructed table data entering device will be described. First, an input table is generated by the input table generating unit 1. The generated input table is retained by the input table retaining unit 2. Then, the individual cells of the input table are filled out with table data, such as titles and element data, by using the table data entering unit 3. The table data entered by the table data entering unit 3, and the cells filled out with the table data are retained by the input data retaining unit 4. Next, the set generating unit 5 generates sets of title string and corresponding element data by using the table data retained by the input data retaining unit 4 and the input table retained by the input table retaining unit 2.

FIG. 10 is a block diagram showing a second embodiment of the table data entering device according to the present invention. In this figure, like portions are designated by like reference numerals in FIG. 1. In the figure, reference numeral 11 designates an input table model retaining unit, and numeral 12, an input table contour parameter designating unit. In the second embodiment, the input table generating unit 1 contains the input table model retaining unit 11 and the input table contour parameter designating unit 12. The input table generating unit 1 generates an input table defined by parameters designated by the input table contour parameter designating unit 12, on the basis of a model of the input table retained by the input table model retaining unit 11.

The input table model retaining unit 11 retains models of input tables to which table data is input. Use of the models retained, an amount of information necessary for generating the input table can be reduced. FIG. 11 is a diagram for explaining a model of the input table. In the figure, MV, MH, $NH_1, \ldots, NH_{MV}, NV_1, \ldots, NV_{MH}$ designate parameters to define the contour of an input table. These parameters are designated by the input table contour parameter designating unit 12. The parameter MV is used for designating the number of layers of column titles. If two title layers, a parent layer and a child layer, are used, the parameter MV is 2. The parameter MH is used for designating the number of layers of row titles. The parameter $NH_i$ designates the number of titles in the i-th layer. If $NH_1=2$ and $NH_2=2$, two parent titles and two child titles are present. Similarly, $NV_i$ designates the number of titles of the i-th layer. Thus, a desired input table can be generated by merely designating a small number of parameters, on the basis of the model of the input table. The generated input table is retained by the input table retaining unit 2. In FIG. 11, respective rectangular blocks are cells to which table data, such as titles and element data, is input by the table data entering unit 3.

The input table generated by the input table generating unit 1 includes two portions. As shown in FIG. 12, the input table consists of a title portion and an element data portion. Table data input to the cells of the title portion becomes titles, and table data input to the cells of the element data portion becomes element data. The operator enters table data to be element data and table data to be titles associated with the element data entered, as in forming a normal table.

FIG. 13 is an explanatory diagram for explaining how to enter titles. As shown in FIG. 11, the input table consists of repeated input cells. To the cells of the highest layer, i.e., the uppermost cells in the column titles and the leftmost input cells in the row titles, titles are independently input. The inputting of the table data, which becomes the titles other than the above, is automatically supplemented so that the repeated input cells have the same titles. A specific example of this will be described. In a table shown in FIG. 13, a column title is repeated two times. The column title has such a structure that one parent column title is followed by three child column titles. Different titles "A" and "B" are, respectively, input to the parent column titles. In the table, the child column title is repeated three times. Accordingly, when "$a_1$" is input to the input cell 1 by the table data entering unit, "$a_1$" is automatically input to the input cell 2. The data input is thus supplemented.

Table data entered by the table data entering unit 3 is retained by the input data retaining unit 4. The input data retaining unit 4 retains the table data entered by the table data entering unit 3 and the input cells to which the table data is input.

The set generating unit 5 picks up all the table data in the title portion, which is located above or on the left side of the table data, in connection with all the table data input to the element data portion. This operation is done referring to the input table in the input table retaining unit 2 and on the basis of the table data retained by the input data retaining unit 4. Then, the picked-up table data in the title portion as title strings and the table data in the element data portion as element data are combined to form title/element data sets.

FIG. 14 is a table for explaining the relationship of titles and element data associated therewith. The fact that table data 1 is present above table data 2 means that a straight line drawn upward from the center of the input cell containing the table data 1 passes through the input cell containing the table data 2. In a specific example shown in FIG. 14, when a straight line is drawn upward from the table data "b", the line passes through the cells of table data "B" and "C". Accordingly, the table data "B" and "C" are present above the table data "b". The same thing can be also applied to the case in which the table data 1 is present on the left side of table data 2. In FIG. 14, table data "E" is located on the left side of the table data "b".

The operation of the set generating unit 5 will be described with reference to FIGS. 15 and 16. FIG. 15 is an explanatory diagram showing a first example of an input table entered by the table data entering unit 3. FIG. 16 is a diagram showing an example of sets of titles and their associated element data generated by the set generating unit 5 on the basis of the input table of FIG. 15. As shown in FIG. 15, in the table, the parent column cell is filled out with title "B", and the child column cells are filled out with titles "C" and "D". The row cells are filled out with titles "E" and "F". The element data cells are filled out with element data "b", "c", "e", and "f". The set generating unit 5 picks up the titles associated with element data. For the element data "b", the set generating unit 5 searches the table data in the title portion that is located above the element data, thereby to find the titles "B" and "C". The set generating unit 5 further searches the table data in the title portion, that is located on the left side thereof, thereby to find the title "E". Finally, the set generating unit 5 combines the thus obtained title string (B, C, E) and the element data "b", thereby forming a set of the title string and the element data. For the remaining element data "c", "e", and "f", the set generating unit 5 takes similar procedures to form sets of title string and their associated element data. The formed sets of the title string and the element data are shown in FIG. 16.

Figure 17:
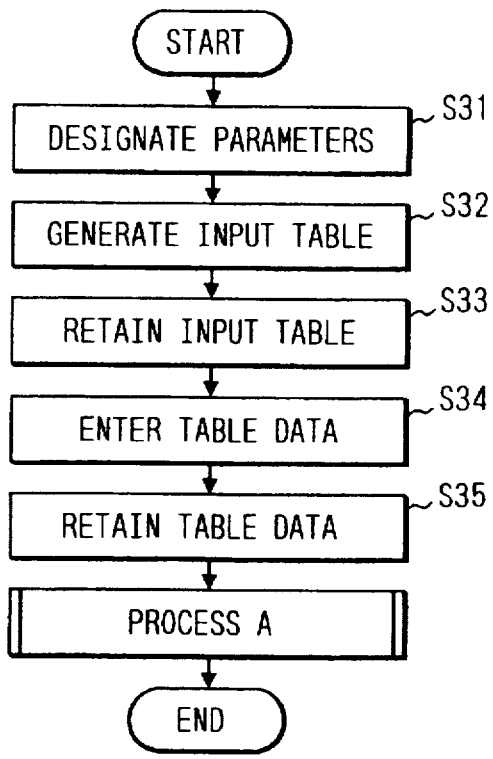
FIG. 17 is a flowchart showing the operation of the first example of the embodiment according to the present invention.
Figure 18:
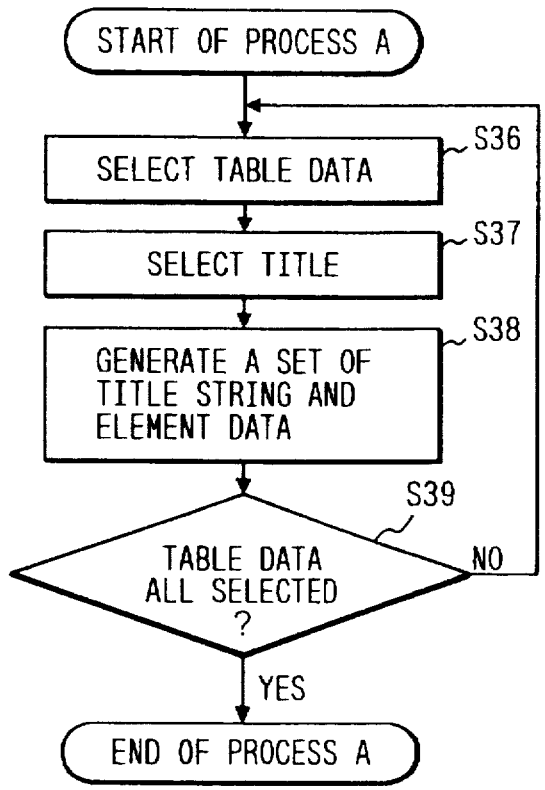
FIG. 18 is a flowchart showing the process A in the flowchart of FIG. 17.

FIGS. 17 and 18 are flowcharts showing the operations of the first example in the embodiment of the present invention. Description to follow is the details of a process to generate the input table as shown in FIG. 15, to enter the necessary data into the table, and to generate sets of the title string and element data as shown in FIG. 16.

In step S31, the input table contour parameter designating unit 12 is operated to designate parameters to define a contour of an input table. In this instance, the parameters are designated: MV=2, $NH_1$=1, $NH_2$=2, MH=1, and $NV_1$=2. In step S32, the input table generating unit 1 generates an input table shaped according to the parameters designated in step S31, on the basis of an input table model retained by the input table model retaining unit 11. In step S33, the input table generated in step S32 is input to and retained by the input table retaining unit 2.

In step S34, the operator enters table data into the input table retained by the input table retaining unit 2, by means of the table data entering unit 3. The first example of the input table is shown in FIG. 15. In step S35, information concerning the cells to which the table data have been input and the table data as well are stored in the input data retaining unit 4. A process A is carried out to generate sets of title string and element data associated with the title string.

The process or subroutine A will be described with reference to FIG. 18. In step S36, one piece of table data is selected from among the table data of which the associated titles are not yet determined. In step S37, all table data in the title portion that are located above or on the left side of the selected table data, are selected. In the example of FIG. 15, as shown in FIG. 14, the table data "B" and "C" in the title portion, located above the table data "b" are selected. The table data "E" in the title portion located on the left side of the element data "b" is also selected. In step S38, a set of a title string and the element data is generated. In this case, the title string consists of the table data selected in step S37 while the element data consists of the table data selected in step S36. In the example shown in FIGS. 14 and 15, a title string (B, C, E) and the element data "b" are combined to form a set of (B, C, E)→b as shown in FIG. 16. A decision diamond of step S39 determines whether or not all the table data in the element data portion have been selected. If the table data not yet selected is present in the element data portion, the system control returns to step S36, and continues to the process to form sets of title string and their associated element data. The process thus far mentioned is repeatedly carried out for all the table data in the element data portion. Consequently, the title/element data sets as shown in FIG. 16 are formed.

FIG. 19 is an explanatory diagram showing a second example of the input table. In the example as stated above, the table data is entered by using the input table shown in FIG. 15. Any other input table than the input table of FIG. 15 may be used for entering the table data. For example, the input table shown in FIG. 19 may be used. The contour of the input table shown in FIG. 19 is different from that of FIG. 15. However, the title/element data sets generated by the set generating unit 5 on the basis of the input table FIG. 19 is the same as those generated on the basis of the input table of FIG. 15. The title/element data sets generated on the basis of the FIG. 19 input table are as shown in FIG. 16.

FIG. 20 is a diagram showing another example of the input table. FIG. 21 is a table showing sets of title string and their associated element data generated by the set generating unit on the basis of the input table of FIG. 20. The input table shown in FIG. 20 contains one column title "A", and a parent column title "B" followed by two child column titles "C" and "D". The structure of the titles cannot be directly expressed using the input table model of FIG. 11. The reason for this is that the block of the title "A" is not the same as that of the parent and child titles "B", "C", and "D". However, the table data of this input table may be expressed using the FIG. 11 model if it is divided into two specific tables as shown in FIGS. 22 and 23. FIGS. 22 and 23 are respectively input tables as first and second portions obtained when the input table of FIG. 20 is divided into two specific portions. These are third and fourth examples of the input table. The title "A" is contained in the first portion shown in FIG. 22. The parent column title "B", and the child column titles "C" and "D" are contained in the second portion shown in FIG. 23. Table data is input to the first and second portions or input tables thus divided. The title/element data sets are generated on the basis of the table data that are input into the first and second input tables. The thus generated title/element data sets are combined together. The resultant title/element data sets are the same as those generated on the basis of the input table of FIG. 20, as shown in FIG. 21.

FIGS. 24 and 25 are flowcharts showing the operation of the table data entering device when an input table is divided into a plurality of input tables for entering table data. In step S41, parameters are designated by the input table contour parameter designating unit 12. In step S42, the input table generating unit 1 generates an input table configured by the parameters designated in step S41, on the basis of an input cell model retained by the input table model retaining unit 11. In step S43, the input table generated in step S42 is input to and retained by the input table retaining unit 2. In step S44, the operator enters table data into the input table retained by the input table retaining unit 2, by means of the table data entering unit 3. In step S45, the input table data and information concerning the input cells to which the input table data have been input are stored in the input data retaining unit 4. In step S46, the system control determines whether or not all the table data have been input. If the answer is NO, viz., when table data is further input to another input table, the system control returns to step S41, and continues the job to set the next input table and to input table data to the input table. After the inputting of table data is completed, the system control proceeds to a process B of which the process flow is shown in FIG. 25. In step S47 of the process B, the system control selects one block of the table data for each input table, of which the associated data are not yet determined, from the input data retained by the input table retaining unit. In step S48, control selects one piece of table data in the element data portion of which the associated data are not yet generated, from the data block selected in step S47. In step S49, control selects all the table data in the title portion, located above or on left side of the table data selected in step S48. In step S50, title/element data sets are generated. In the title/element data sets, the table data selected in step S49 is used as title strings. The table data selected in step S48 is used as element data. In step S51, the system control determines whether or not all the table data in the element data portion of one block of input table selected in step S47 have been selected. If the answer is NO, the system control returns to step S48 and generates a title/element data set for the next data. When all the table data in the input table block have been selected, the system control proceeds to step S52. In this step S52, the system control determines whether or not all the input table blocks have been selected. If a block or blocks are not yet selected, the system control returns to step S47, and selects the next block and continues the subsequent process. When all the blocks are selected, the process B ends.

The operation of the table data entering device will further be described by using the two input tables shown in FIGS. 22 and 23. To generate the input table as shown in FIG. 22, in step S41 (FIG. 24), the parameters are designated: MV=1, $NH_1=2$, MH=1, and $NV_1=1$. As a matter of course, the input table contour parameter designating unit 12 is used for the parameter setting. In step S42, an input table is generated. The generated input table is retained in step S43, and table data is input to the retained input table by the table data entering unit 3 in step S44. The table data input is grouped, for every input table, into blocks which then are retained by the input data retaining unit 4.

At this time, the data to be input is still present. Accordingly, the system control returns from step S46 to step S41, and continues the process. In this process, an input table as shown in FIG. 23 is generated and table data is input to the input table. In step S41, parameters are designated by the input table contour parameter designating unit 12 as follows: MV=2, $NH_1=1$, $NH_2=2$, MH=1, and $NV_1=2$. Through the process of steps S42 to S45, an input table is generated, table data is input to the input table, table data is grouped into blocks, and the table data blocks are retained by the input data retaining unit 4. There is no data to be input. Accordingly, control goes from step S46 to the process B.

In step S47, the input table data of one block is selected. For example, table data of the input table that is input later can be selected. Through the process of steps S48 to S51, sets of title sting and their associated element data are generated as in the case of FIG. 15. In step S52, there is still the input table data of one block not yet selected. Accordingly, control goes from step S51 to step S47, and continues the process. In this process, the table data of the input table previously input is selected. Through steps S48 through S51, sets of title string and element data are generated. In step S52, the input process ends since the two processes have been completed. The resultant title/element data sets are as tabulated in FIG. 21.

Figures 26, 27:
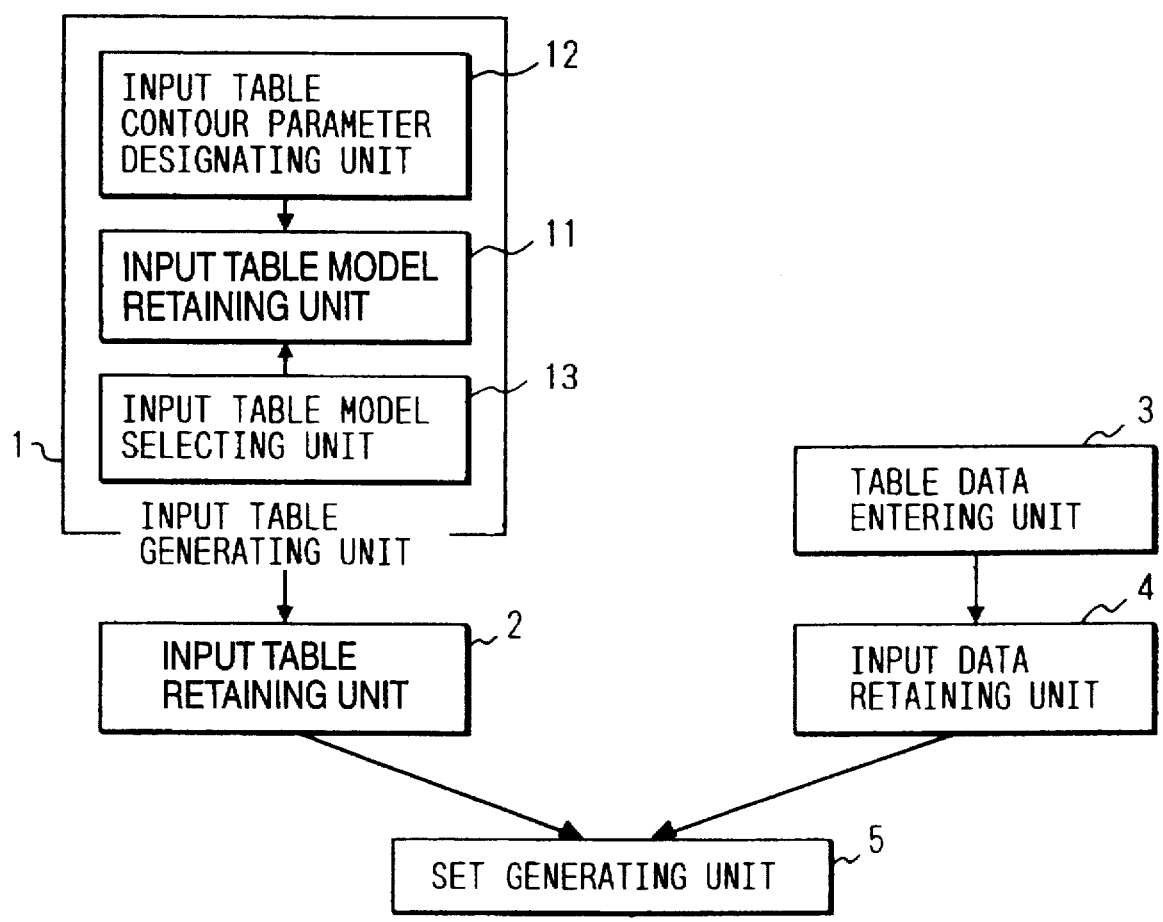
FIG. 26 is an explanatory diagram showing a fifth example of the input table.
FIG. 27 is a block diagram showing a third embodiment of the table data entering device according to the present invention.

FIG. 26 is an explanatory diagram showing a fifth example of the input table. The input table as shown in FIG. 20 may be input in the form of an input table shown in FIG. 26. That is, the FIG. 26 table is generated and table data is input to the generated input table. As shown, in the input table of FIG. 26, two parent column titles are juxtaposed each being followed by three child column titles. In this input table, the input table model shown in FIG. 11 may be used. In the table of FIG. 26, the column of the parent title A in FIG. 20 is described such that the parent title A is followed by three child title cells, one filled out with nothing and the remaining two cells being filled out "C" and "D". The cells of the column having the child title filled out with nothing are filled out with element data "a" and "d", while the cells of the columns having the child titles "C" and "D" are filled out with nothing. The parent title "B" is followed by three child titles; one filled out with nothing and the remaining two being filled out with "C" and "D". The cells of the column of the child title filled out with nothing are also filled out with nothing, and the cells of the columns having the child titles "C" and "D" are filled out with element data "b" and "e", and "c" and "f", respectively. The cells filled out with nothing are disregarded by the set generating unit 5. The titles associated with the element data "a" are "A" and "E". The titles associated with the element data "b" are "B", "C", and "E". Therefore, the input table as shown in FIG. 26 may produce the title/element data sets as shown in FIG. 21.

Figure 28:
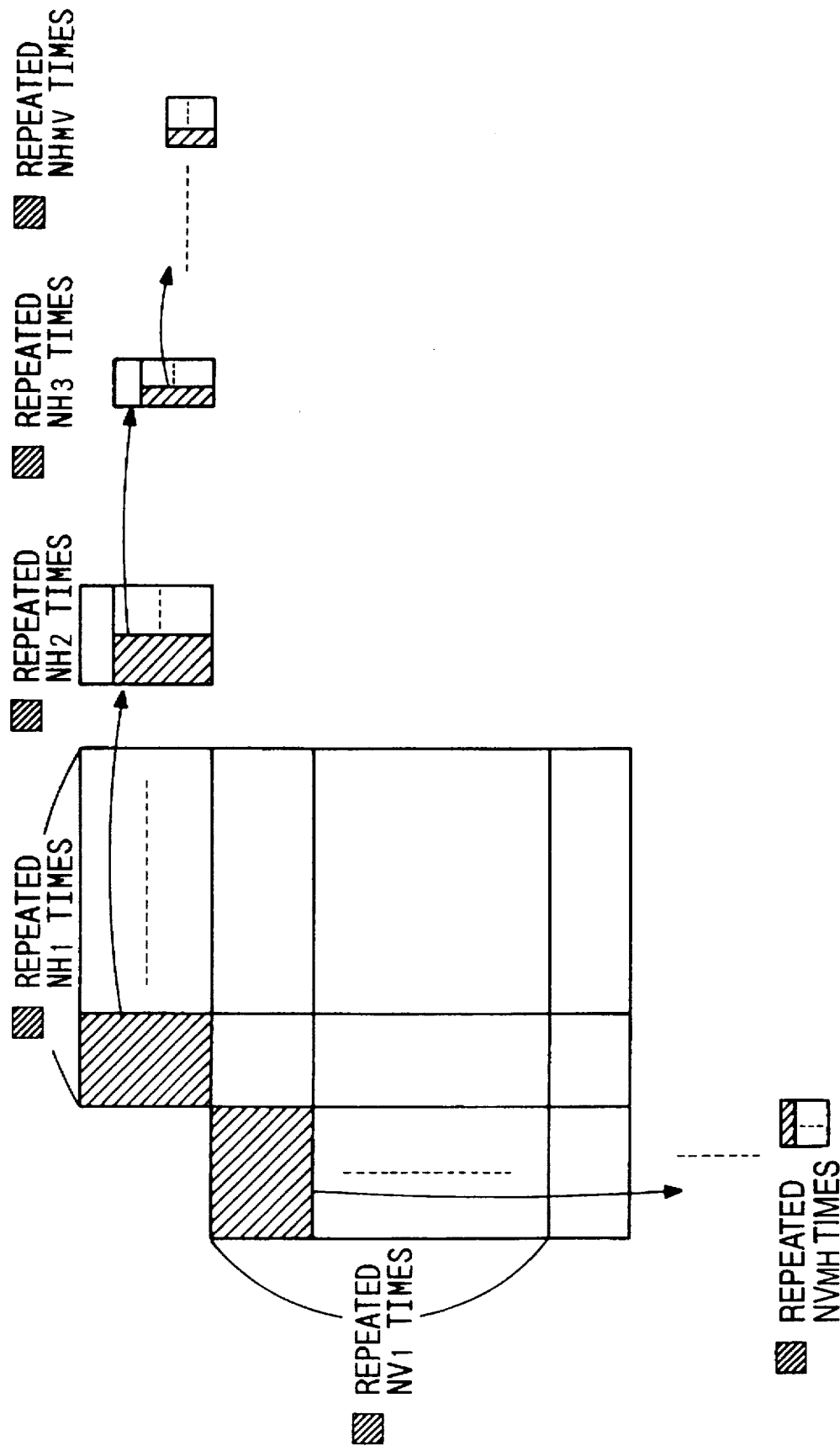
FIG. 28 is an explanatory diagram showing another model of the input table.

FIG. 27 is a block diagram showing a third embodiment of the table data entering device according to the present invention. In FIG. 27, like portions are designated by like reference numerals in FIG. 10. Reference numeral 13 designates an input table model selecting unit. In the third embodiment, the input table generating unit 1 includes the input table model retaining unit 11, the input table contour parameter designating unit 12, and the input table model selecting unit 13. The input table model retaining unit 11 retains a plurality of models of the input table, such as, the models shown in FIG. 11 and lists including a model of the input table shown in FIG. 28. FIG. 28 is an explanatory diagram showing another model of the input table. The model of FIG. 28 is different from the model of FIG. 11 in that it has an additional title row in the lowermost row. A model of such an input table as shown in FIG. 20 may further be retained in the input table model retaining unit 11. The input table model selecting unit 13 selects and designates a model of the input table to be used from among the models retained in the input table model retaining unit 11. The input table generating unit 1 generates an input table on the basis of the model selected by the input table model selecting unit 13 and the parameters designated by the input table contour parameter designating unit 12.

Thus, in the third embodiment of the present invention, different types of input tables are previously stored. Accordingly, the operator properly selects a model as occasion demands, and inputs table data to the selected input table.

The operation of the third embodiment will be described. The operation of the third embodiment is different from that of the second embodiment in that the operator selects one of the plurality of the input table models that are retained in the input table model retaining unit 11. The operation following the selection of the model is the same as that of the second embodiment.

When a model of the input table as shown in FIG. 28 is selected and table data is input using an input table as shown in FIG. 29, sets of title string and element data associated therewith as shown in FIG. 30 are generated. FIG. 29 is an explanatory diagram showing a sixth example of the input table that is entered by the table data entering unit 3. FIG. 30 is a table showing title/element data sets generated by the set generating unit when the input table shown in FIG. 29 is entered. In this process, the input table model shown in FIG. 28 is first selected by the input table model selecting unit 13. The parameters are designated by the input table contour parameter designating unit 12 as follows: MV=1, NH$_1$=2, MH=2, NV$_1$=2, and NV$_2$=2. An input table is generated on the basis of the selected model and the designated parameters. As a result, table data is input by the table data entering unit 3, as shown in FIG. 29. Finally, the set generating unit 5 generates the title/element data sets as shown in FIG. 30, on the basis of the generated input table and the input table data.

Figures 31, 32, 33:
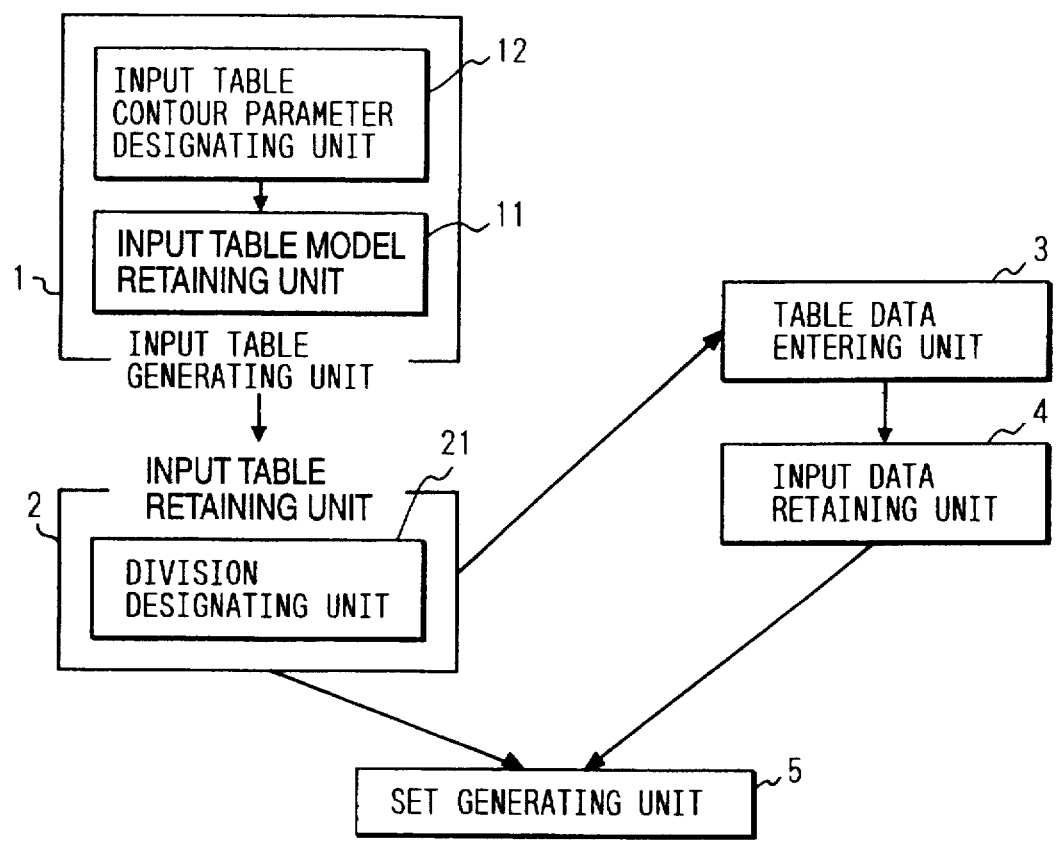
FIG. 31 a block diagram showing a fourth embodiment of the table data entering device according to the present invention.
FIG. 32 an explanatory diagram showing a seventh example of the input table.
FIG. 33 is a diagram showing an input table formed after the input table entered is divided.

FIG. 31 is a block diagram showing a fourth embodiment of the table data entering device according to the present invention. In the figure, like portions are designated by like reference numerals in FIG. 10. Reference numeral 21 designates a division designating unit. In the fourth embodiment, the division designating unit 21 is contained in the input table retaining unit 2. The division designating unit 21 is used for designating the cell to be divided, the direction of the division, and the number of subcells resulting from the cell division. The designated cell of the input table is divided into the designated number of subcells in the designated direction.

FIG. 32 is an explanatory diagram showing a seventh example of the input table that is entered by the table data entering unit. FIG. 33 is a diagram showing an input table formed after the input table entered is divided. The input table as shown in FIG. 20 can be input without altering the form of the table. As a first step, the input table shown in FIG. 32 is generated. To generate this table, the parameters are designated as MV=1, NH$_1$=2, MH=1, and NV$_1$=2 by the input table contour parameter designating unit 12. In this state, table data "a" and "b" can be input. Input cells 1 and 2 must be filled out with table data "b" and "c", and "e" and "f". However, these cells 1 and 2 each consists of one cell. Therefore, each of these cells must be divided into two subcells. To divide the cells, the input cells 1 and 2 are designated for the cells to be divided; the lateral direction, for the direction in which the cells are divided; 2, for the number of subcells resulting from the cell division. As a result, the input cells 1 and 2 are divided into subcells, and the title cells are generated, thereby to obtain an input table as shown in FIG. 33. The input table divided thus accepts the table data as shown in FIG. 20 when it is entered.

In the table data entering device of the fourth embodiment of the present invention, with provision of the division designating unit 21, a complicated input table can be handled in a manner that a simple input table is gradually altered into a complicated one. Further, the table data entering device of this embodiment is improved over the case of FIGS. 22 and 23 where a plurality of input tables are used in that there is no need of repeating the inputting of the same title. Thus, this embodiment saves the labor to enter the data.

Figure 34:
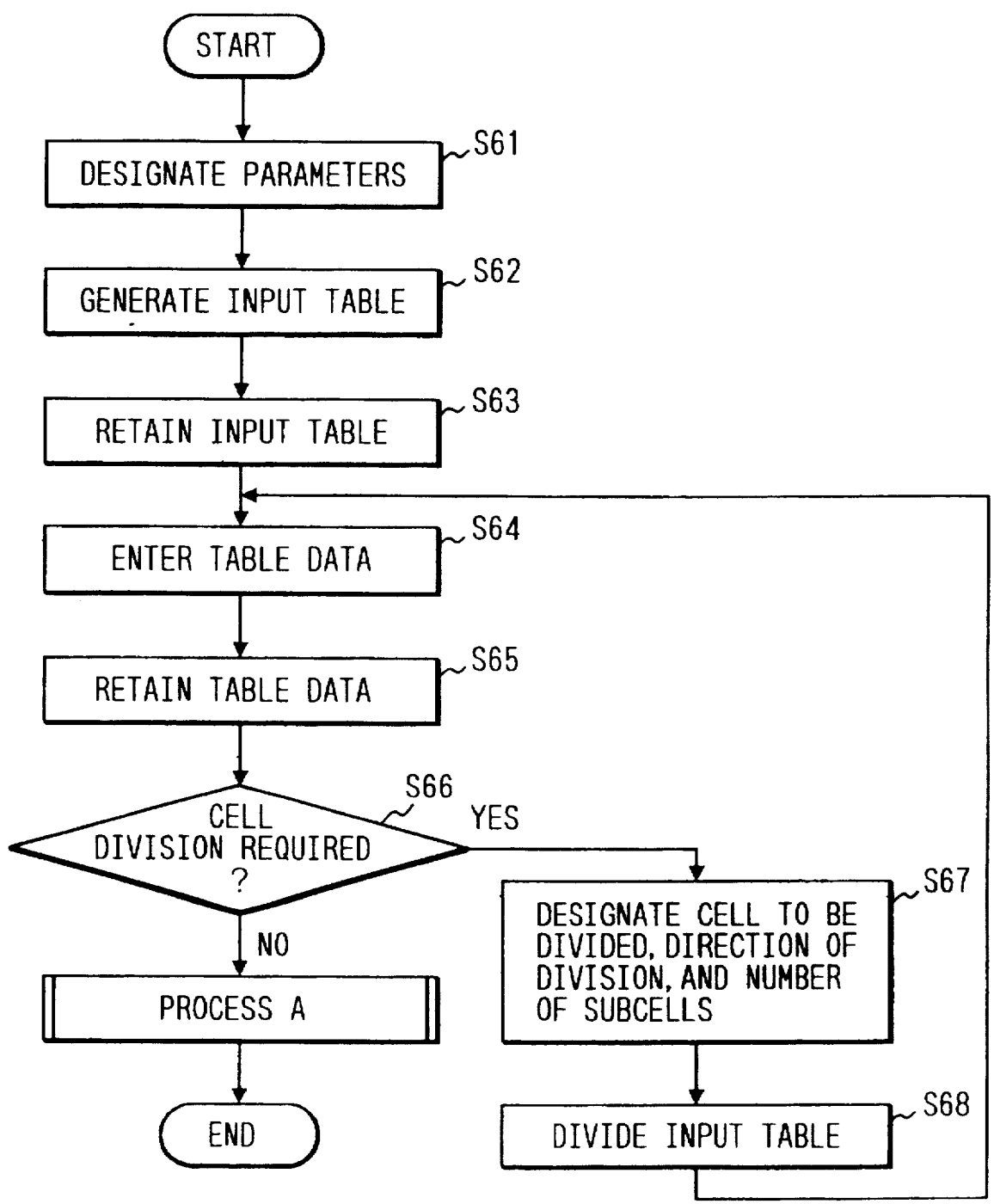
FIG. 34 is a flowchart showing the operation of the table data entering device of FIG. 31 to divide an input table.

FIG. 34 is a flowchart showing the operation of the table data entering device of FIG. 31 to divide an input table. In step S61, parameters are designated by the input table contour parameter designating unit 12. In step S62, the input table generating unit 1 generates an input table with a contour designated by the parameters on the basis of the model retained by the input table model retaining unit 11. In step S63, the generated input table is retained in the input table retaining unit 2. In step S64, the operator inputs or enters table data into the input table that is retained in the input table retaining unit 2, by using the table data entering unit 3. In step S65, the input table data is retained in the input data retaining unit 4.

In step S66, the system control determines whether or not the cell division is required. If the cell division is required, the system control proceeds to step S67 where the cell division is carried out. In step S67, the cell to be divided, the division direction, and the number of subcells are designated by the division designating unit 21. In step S68, the input table retaining unit 2 divides the designated cell into subcells as designated by the division designating unit 21. After the division process, control returns to step S64. The inputting of the table data is continued. If the cell division is not required, control proceeds to a process A where sets of title string and element data associated therewith are generated. The process A is the same as that in FIG. 19. Hence, no further description of it will be given.

Needless to say, the table data entering device of the fourth embodiment is also operable in a manner that, as in the third embodiment, a plurality of models are retained in the input table model retaining unit 11, and a desired model is selected from those models retained, by the input table model selecting unit 13 additionally provided.

As seen from the foregoing description, when the table data entering device of the invention is used, table data is input to an input table frame, or the input table, in the form of a table. When comparing with the conventional table data entering device in which strings of titles and element data are separately entered, the table data entering device of the invention can enter the table data through a decreased number of operations to enter the data. This feature eliminates such mistakes as the missing of data to be entered, the entering of the same data repeatedly in entering the table data.

The input table is temporarily used for ease of entering the table data. The form of the input table is not always the form of an actual table to be formed. Therefore, there is no need of designating details of the table and the layout thereof. The input table can be generated by merely designating necessary parameters when the device contains a model or models of the input table. That is, the generation of the input table is very simple, reducing the labor of the operator to enter the data. Where a plurality of models are contained, the data entering operation is further easier since the operator can select his desired input table. The input table easy to enter the table data can be generated. An input table having the form different from that of a desired table may be used to enter the data. To enter a complicated table, it is altered into a plurality of simple input tables, and the table data is input to those simple tables. Where a cell division is permitted, the cell of a simple input table is divided repeatedly. A complicated input table can be formed gradually. Therefore, the form designation is easy.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A table data entering device comprising:

input table frame generating means for generating an input table frame in the form of a table;

input table retaining means for retaining the input table frame;

table data entering means for entering table data containing titles and element data with the aid of the input table frame retained in said input table retaining means;

input data retaining means for retaining the entered table data; and set generating means for generating data sets of title string data and element string data associated therewith from the table data retained in said input data retaining means, each of said sets including at least one string of title having at least one title data and at least one string of element data having at least one element data in accordance with the input table frame retained in said input table retaining means; and means for designating the title string of one of the sets of title and element string data for movement of the entire one set to another designated table position.

2. A table data entering device for entering titles and element data necessary for forming a table, comprising:

means for designating a relationship, including a title string, among layers of the titles in the table;

input table frame generating means for generating an input table frame in the form of a table used for entering titles and element data, on the basis of the layer relationship designated by said designating means;

table data entering means for entering titles and element data into the input table frame;

said input table frame consist of a title input portion based on the designated layer relationship of the titles and an element data input portion varying depending on the combination of the designated layer relationship; and means for designating a title data for movement of the designated title data and associated element data to another designated table location.

3. The table data entering device according to claim 2, further comprising set generating means for generating sets of the element data entered into the input table frame and a title string in which the titles corresponding to the element data are lined up.

4. The table data entering device according to claim 2, wherein said designating means includes a column layer relationship for designating a relationship among the titles in a column direction and a row layer relationship for designating a relationship among the titles in a row direction.

5. A table data entering device for entering titles and element data necessary for forming a table, comprising:

means for designating a relationship, including a title string, among layers of the titles in the table;

input table frame generating means for generating an input table frame in the form of a table used for entering titles and element data, on the basis of the layer relationship designated by said designating means; and table data entering means for entering titles and element data into the input table frame, said input table frame consisting of a title input portion based on the designated layer relationship of the titles and an element data input portion varying depending on the designated layer relationship; and when a plurality of first layer cells are provided by said designating means and a relationship between one of the first layer cells and second layer cells belonging to the one first layer cell is common to all of the first layer cells, and when a title is entered into the title input portion of a certain second layer cell, said table data entering means automatically setting said entered title to the title input portion of the second layer cells corresponding to the remaining first layer cells.

6. The table data entering device according to claim 5, further comprising set generating means for generating sets of the element data entered into the input table frame and title string data in which title data corresponding to the element data are lined up.

7. A table data entering device for entering title and element data necessary for forming a table, comprising:

means for designating a relationship among layers of the title data in the table;

input table frame generating means for generating an input table frame in the form of a table used for entering title data and element data, on the basis of the layer relationship designated by said designating means;

means for desirably editing the title data of the input table frame generated by said input table generating means;

table data entering means for entering the title and element data into the edited input table frame, said input table frame consisting of a title input portion based on the edited layer relationship of the title data and an element data input portion varying depending on the combination of the edited layer relationship; and means for designating a title data for movement of the designated title data and associated element data to another designated table location.

8. The table data entering device according to claim 7, wherein the designating means comprises means for designating a title string, and further comprising set generating means for generating sets of the element data entered into the input table frame and title string in which the titles corresponding to the element data are lined up.

* * * * *

UNITED STATES PATENT AND TRADEMARK OFFICE
CERTIFICATE OF CORRECTION

PATENT NO.    : 5,537,633
DATED         : July 16, 1996
INVENTOR(S)   : Akira SUZUKI et al.

It is certified that error appears in the above-indentified patent and that said Letters Patent is hereby corrected as shown below:

Claim 2, column 15, line 30 "consist" should read --consisting--.

Signed and Sealed this

Twenty-ninth Day of July, 1997

Attest:

BRUCE LEHMAN

Attesting Officer        Commissioner of Patents and Trademarks